(12) United States Patent
Schneider et al.

(10) Patent No.: US 8,502,408 B2
(45) Date of Patent: Aug. 6, 2013

(54) POWER OVER ETHERNET PRIORITIZATION SYSTEM AND METHOD FOR SURVEILLANCE CAMERAS

(75) Inventors: Peter Schneider, Decatur, GA (US); Cheng Jia, Tucker, GA (US); Chris Harden, Griffin, GA (US); James L. Pfaffenberger, Marietta, GA (US)

(73) Assignee: Videolarm, Inc., Decatur, GA (US)

( * ) Notice: Subject to any disclaimer, the term of this patent is extended or adjusted under 35 U.S.C. 154(b) by 0 days.

(21) Appl. No.: 13/579,000

(22) PCT Filed: Mar. 18, 2011

(86) PCT No.: PCT/US2011/028944
§ 371 (c)(1),
(2), (4) Date: Aug. 14, 2012

(87) PCT Pub. No.: WO2011/116258
PCT Pub. Date: Sep. 22, 2011

(65) Prior Publication Data
US 2012/0319468 A1 Dec. 20, 2012

Related U.S. Application Data

(60) Provisional application No. 61/315,540, filed on Mar. 19, 2010.

(51) Int. Cl.
*H02J 1/00* (2006.01)
*H02J 3/00* (2006.01)
*H02J 3/02* (2006.01)
(52) U.S. Cl.
USPC .............................................. 307/1
(58) Field of Classification Search
USPC .................. 307/1, 3, DIG. 1; 340/310.11
See application file for complete search history.

(56) References Cited

U.S. PATENT DOCUMENTS

| 6,880,987 B2 | 4/2005 | Diana et al. |
| 7,081,827 B2 | 7/2006 | Addy |
| 7,340,325 B2 | 3/2008 | Sousa et al. |

(Continued)

FOREIGN PATENT DOCUMENTS

| JP | 2006140665 A | 11/2004 |
| JP | 2008099026 A | 10/2006 |

OTHER PUBLICATIONS

International Search Report and Written Opinion of PCT/US2011/028944 dated May 20, 2011; 10 pgs.

(Continued)

*Primary Examiner* — Carlos Amaya
(74) *Attorney, Agent, or Firm* — Gardner Groff Greenwald & Villanueva, PC

(57) ABSTRACT

The present invention provides a system and method for prioritized application of operational power receiving over a data transmission cable. The system includes a primary component, at least one secondary component, and a power supply. The system further includes a data transmission cable for transmitting operational power from the power supply to the primary component and the at least one secondary component, and for transmitting data between the primary component and a remote station. The system further includes a splitter for separating the operational power from the data received over the data transmission cable, and prioritizing delivery of the operational power to the primary component and the at least one secondary component, wherein at least a threshold level of power is delivered to the primary component, and available operational power in excess of the threshold level is delivered to the at least one secondary component.

22 Claims, 6 Drawing Sheets

U.S. PATENT DOCUMENTS

| | | |
|---|---|---|
| 7,446,654 B2 | 11/2008 | Addy |
| 7,484,109 B2 | 1/2009 | Feldman et al. |
| 7,549,067 B2 | 6/2009 | Tolliver |
| 7,565,555 B2 | 7/2009 | Diab |
| 7,723,862 B1 | 5/2010 | Spillman et al. |
| 7,809,960 B2 | 10/2010 | Cicchetti et al. |
| 7,814,346 B2 | 10/2010 | Diab |
| 7,870,401 B2 | 1/2011 | Diab et al. |
| 7,873,057 B2 | 1/2011 | Robitaille et al. |
| 7,886,165 B2 | 2/2011 | Khan et al. |
| 8,020,013 B2 | 9/2011 | Lin |
| 8,106,530 B2 | 1/2012 | Schindler et al. |
| 2003/0112965 A1 | 6/2003 | McNamara et al. |
| 2004/0136388 A1 | 7/2004 | Schaff |
| 2005/0044431 A1 | 2/2005 | Lang et al. |
| 2006/0149978 A1 | 7/2006 | Randall et al. |
| 2009/0290023 A1 | 11/2009 | Lefort et al. |
| 2009/0300391 A1 | 12/2009 | Jessup et al. |
| 2010/0106985 A1 | 4/2010 | Panguluri et al. |
| 2010/0138678 A1 | 6/2010 | Huang |

OTHER PUBLICATIONS

International Preliminary Report on Patentability of PCT/US2011/028944 dated May 11, 2012; 29 pgs.

POWER OVER ETHERNET PRIORITIZATION SYSTEM AND METHOD FOR SURVEILLANCE CAMERAS

CROSS-REFERENCE TO RELATED APPLICATIONS

This application claims the benefit of U.S. Provisional Patent Application Ser. No. 61/315,540, filed Mar. 19, 2010, the entirety of which is incorporated herein by reference for all purposes.

FIELD OF THE INVENTION

The present invention relates generally to the field of power delivery to electronic devices, and more particularly to a system and method for prioritization of power delivery to primary and secondary components of an electronic system.

BACKGROUND OF THE INVENTION

Surveillance camera systems for remote observation and image data recording commonly include a housing, a camera mounted within the housing, a pan-tilt-zoom (PTZ) system for controlling the camera's field of view, and/or a heating and blower (H&B) system for protecting electronics from temperature extremes and preventing condensation on or in the housing. Provision of electrical power to an internet protocol (IP) camera by power over Ethernet (POE) delivery is a growing trend.

In POE applications, operational power is delivered to electronic devices over one or more conductor channels of an Ethernet cable such as for example a Category 5 (CAT5) cable. The IEEE 802.3af POE standard provides up to 15.4 W of DC power to a device over Ethernet cable. The more recent IEEE 802.3at standard (sometimes called POE+) provides up to 25 W of power or more.

SUMMARY OF THE INVENTION

The Embodiments of the present invention provide a system and method for prioritized application of operational power received over a data transmission cable. Briefly described, in architecture, one embodiment of the system, among others, can be implemented as follows. The system includes a primary component, at least one secondary component, and a power supply. The system further includes a data transmission cable for delivering operational power from the power supply to the primary component and the at least one secondary component, and for transmitting data between the primary component and a remote station. The system further includes a splitter for separating the operational power from the data received over the data transmission cable, and prioritizing delivery of the operational power to the primary component and the at least one secondary component, wherein at least a threshold level of power is delivered to the primary component, and available operational power in excess of the threshold level is delivered to the at least one secondary component.

Embodiments of the present invention can also be viewed as providing a method of prioritizing delivery of operational power to a primary component and a secondary component. The method preferably includes the steps of delivering operational power and data over a shared data transmission cable, and delivering operational power from the data transmission cable to a primary component. The method further includes comparing the operational power delivered to the primary component relative to a threshold power level, and delivering available power in excess of the threshold level to the secondary component.

Embodiments of the present invention can also be viewed as providing a method of prioritizing delivery of operational power to a primary component and a secondary component embodied in a computer program product for execution on an instruction processing system, comprising a tangible storage medium readable by the instruction processing system and storing instructions for execution by the instruction processing system for performing the method. In this regard, one embodiment of such a method, among others, can be broadly summarized by the following steps. The method operates by measuring the operational power delivered to the primary component, comparing the operational power delivered to the primary component relative to a threshold power level and delivering available power in excess of the threshold level to the secondary component.

Embodiments of the present invention can also be viewed as providing a power over Ethernet prioritization system for delivery of power to a surveillance camera system. Briefly described, in architecture, one embodiment of the system, among others, can be implemented as follows. The system includes a video camera mounted within a camera housing, the video camera having a pan-tilt-zoom mechanism associated therewith, and a heater for application of heat within the camera housing. The system further includes a midspan power supply, an Ethernet cable for delivery of power and data between the midspan power supply and the video camera, the pan-tilt-zoom mechanism, and the heater, and a splitter comprising switching circuitry for limiting power delivery to the heater to ensure adequate delivery of power to the video camera.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE INVENTION

Figure 1:
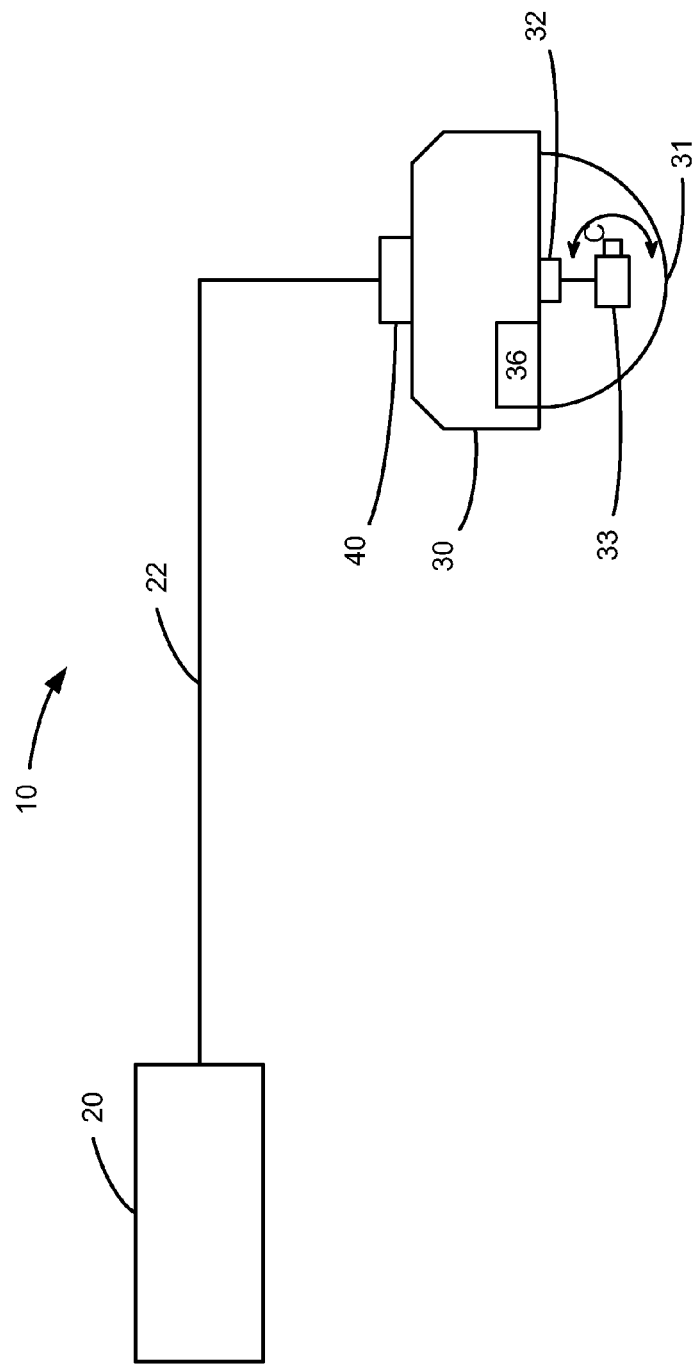
FIG. 1 is a system view of a power prioritization system according to an example embodiment of the present invention.

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

In example embodiments, the present invention provides improved systems and methods for delivery of power to electronic systems. Power over ethernet (POE) power delivery is prioritized to first ensure delivery of sufficient power to operate a primary electronic device of the system, and allocate remaining power to one or more secondary electronic devices of the system. In surveillance camera system embodiments, power is prioritized for delivery first to the camera for imaging, as the primary device. Remaining power is routed to one or more secondary devices such as the pan-tilt-zoom (PTZ) mechanism and/or heating and blower (H&B) subsystems. Optionally, power delivery to the secondary devices, is further prioritized with essential secondary devices such as the PTZ subsystem allocated a higher priority for power utilization than non-essential secondary or tertiary devices such as the H&B subsystem.

In one aspect, the present invention relates to a system for prioritized application of operational power delivered over a data transmission cable. The system includes a primary component, at least one secondary component, and a power supply. The system further includes a data transmission cable for delivering operational power from the power supply to the primary component and the at least one secondary component, and for delivering data between the primary component and a remote station. The system also includes a splitter for separating the operational power from the data delivered over the data transmission cable, and prioritizing delivery of the operational power to the primary component and the at least one secondary component, so that at least a threshold level of power is delivered to the primary component, and available operational power in excess of the threshold level is delivered to the at least one secondary component.

In another aspect, the invention relates to a method of prioritizing delivery of operational power to a primary component and a secondary component. The method includes delivering operational power and data over a shared data transmission cable, delivering operational power from the data transmission cable to a primary component, comparing the operational power delivered to the primary component relative to a threshold power level, and delivering available power in excess of the threshold level to the secondary component.

In still another aspect, the invention relates to a power over Ethernet splitter for delivery of operational power to a primary component and a secondary component. The splitter includes means for sensing a state of power delivery to the primary component, means for comparing the state of power delivery to the primary component relative to a threshold value, and means for delivery of operational power in excess of the threshold value to the secondary component.

In another aspect, the invention relates to a power over Ethernet prioritization system for delivery of power to a surveillance camera system. The system includes a video camera mounted within a camera housing, the video camera having a pan-tilt-zoom mechanism associated therewith, and a heater for application of heat within the camera housing. The system also includes a midspan power supply and an Ethernet cable for delivery of power and data between the midspan power supply and the video camera, the pan-tilt-zoom mechanism, and the heater. The system also includes a splitter comprising switching circuitry for limiting power delivery to the heater to ensure adequate delivery of power to the video camera.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

With reference now to the drawing figures, wherein like reference numbers represent corresponding parts throughout the several views, FIG. 1 is a system view of a surveillance camera system 10 The surveillance camera system 10 incorporates a power prioritization system 100 according to an example form of the invention. In example forms, a higher priority is allocated to power delivery to a primary component such as the surveillance camera's 33 operational power, and lower priority is given to secondary components such as the PTZ mechanism 32 and/or H&B subsystem 36. In alternate example forms, the camera 33 and PTZ mechanism 32 are designated the primary components, and the H&B subsystem 36 is the secondary component. Optionally, two or more secondary components may be designated as essential or non-essential secondary components, or as secondary and tertiary components, with the primary component(s) having the highest priority for receiving operational power, the essential secondary components receiving a medium priority, and the non-essential secondary or tertiary components receiving the lowest priority. For example, the camera may be designated the primary component, the PTZ mechanism 32 as an essential secondary component, and the H&B subsystem 36 as a non-essential or tertiary component. The power device prioritization is generally assigned at the time of programming the microcontroller 50. However, the power device prioritization can be altered at any time during the life of the microcontroller 50.

The surveillance camera system 10 includes a video surveillance camera 33 mounted within a camera housing 30, dome 31, a pan-tilt-zoom (PTZ) mechanism 32, and a heating and blower in H&B subsystem 36. The camera 33 can be, for example, an internet protocol (IP) camera. The PTZ mechanism 32 may be integral with or onboard the camera 33 and/or the camera housing 30, or alternatively can comprise separate components operatively coupled thereto. In further alternate forms, the camera 33 is a fixed camera without a PTZ mechanism 32. The H&B subsystem 36 optionally comprises one or more heaters, such as for example an electrical resistive heating element, and one or more fans for circulating an airflow into or though the camera housing 30. The fans can be configured as inlet, exhaust and/or circulation fans for heating, cooling, dust and debris removal, and/or removal of condensation or fogging from the dome 31 or the lens of camera 33.

A power over Ethernet (POE) midspan power supply 20 simultaneously delivers operative power and data signals via an Ethernet cable 22 to and from the camera 33, the PTZ mechanism 32, and/or the H&B subsystem 36. In example form, the midspan power supply 20 delivers approximately 30-35 Watts of 56 Volt DC electrical power. In alternate forms, the power supply may provide higher or lower power levels depending upon the intended application, associated equipment, and/or anticipated loads. In example form, the Ethernet cable 22 includes, but is not limited to, a Category 5/5e, Category 6/6A or any variation known or later developed cable, having a plurality of conductors or channels. Corresponding terminal connectors are preferably provided to couple the ends of cable 22 with cooperating coupling receptacles of associated components. A first end of the cable 22 is connected to the midspan power supply 20.

A POE splitter 40 is operatively coupled to or integrated into the camera housing 30, and connected to the second end of the cable 22. The POE splitter 40 separates operational power from data signals to and from the camera 33 for control of the camera 33 and/or the PTZ mechanism 32, and from image data collected by the camera 33 for transmission to a remote viewing station. The operational power is routed from the POE splitter 40 to the camera 33, the PTZ mechanism 32 and/or the H&B subsystem 36. The POE splitter 40 includes electronic circuitry, for example resident on a printed circuit board or integrated circuit chip.

Figure 2:
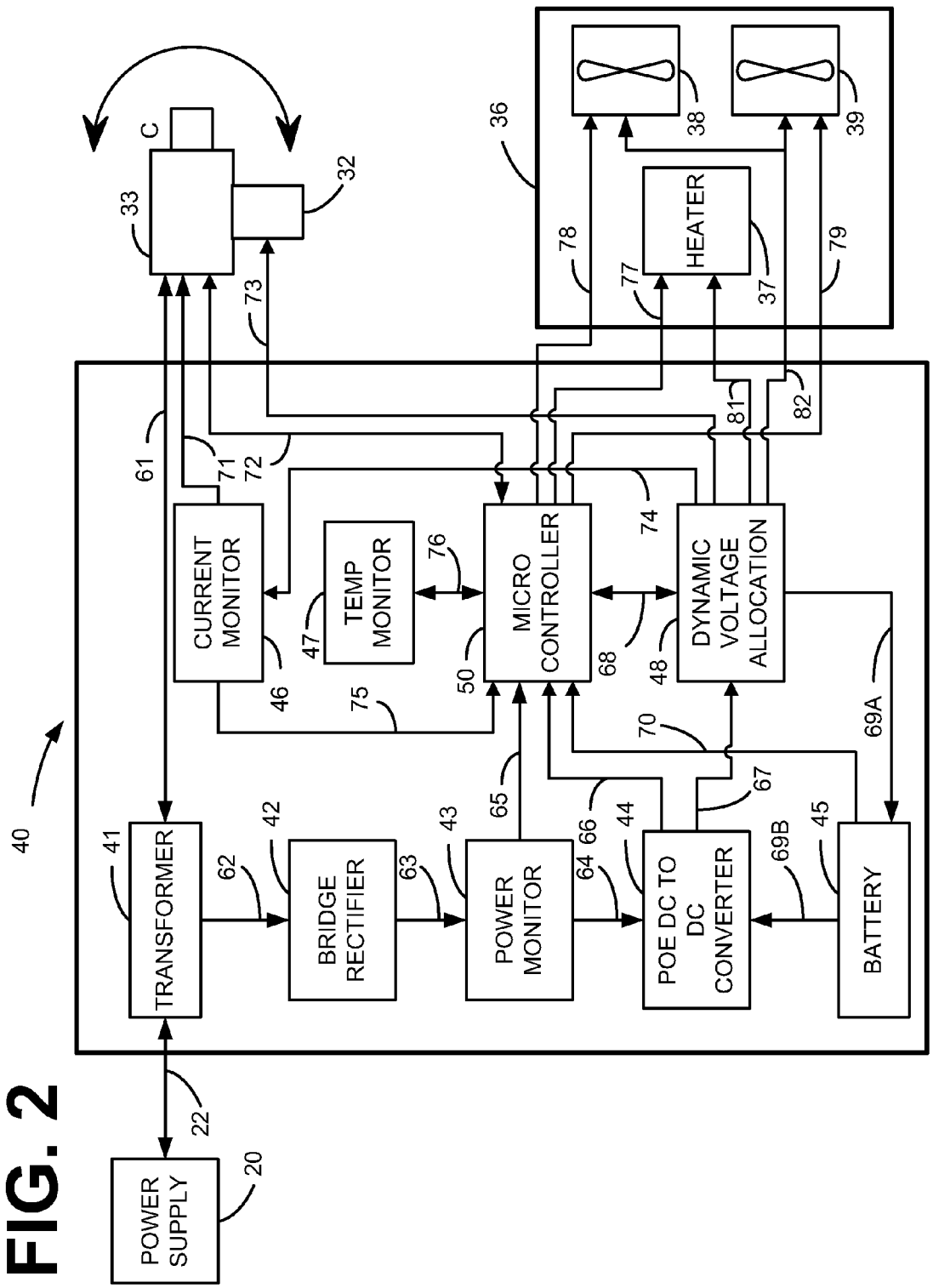
FIG. 2 is a block diagram showing components of a splitter according to an example embodiment of the present invention implementing a power prioritization system of the present invention.

FIG. 2 is a block diagram showing components of POE splitter 40 according to an example embodiment of the present invention. In one embodiment, the microcontroller 50 in POE splitter 40, receives input from one or more associated sensors, and controls operation of the heater 37, fan 38, and/or other components to optimize power consumption and operational efficiency depending on one or more measured values or operational states, including without limitation, the temperature sensed within the camera housing 30, the operational state (on/off/level) of the heater 37, humidity within the camera housing 30, ambient temperature, etc.

The POE splitter 40 is operatively coupled to or integrated into the camera housing 30, and connected to the second end of the cable 22 that has a first end of the cable 22 connected to the POE midspan power supply 20. The POE splitter 40 separates operational power from data signals to and from the camera 33 for control of the camera 33 and/or the PTZ mechanism 32, and from image data collected by the camera 33 for delivery to a remote viewing station.

The second end of the cable 22 is connected to transformer 41. Transformer 41 provides power to camera 33 on the link 61. Image data from camera 33 comes back to the midspan power supply 20 via the same cable 22 that the power come down. This is an advantage of the present invention in that one (1) cable 22 does everything. Another advantage of the present invention is that it is very simple to install. Generally, there are 8 wires in a Cat 5/Cat 6 cable. Currently, available midspans units typically send data down the first 2 pair, power down the other 2 pairs and so on. Other midspans units send power down all eight over the same lines that the network data goes down. The present invention can work with either type midspan. The transformer 41 also provides power and data signals to the bridge rectifier 42 utilizing link 62. The bridge rectifier 42 provides for conversion of an alternating current (AC) input into direct current a (DC) output. The bridge rectifier 42 provides DC current to the power monitor 43 via link 63.

The power monitor 43 then provides the DC current to the power over ethernet DC to DC converter 44 over link 64. The DC to DC converter 44 drop voltage down for the lower voltage devices. In one embodiment, for the microcontroller 50 and the fans 38 and 39. The power monitor 43 also provides a signal line 65 indicating the current POE DC power level to the microcontroller 50. The POE DC to DC converter 44 then provides power to the microcontroller 50 via link 66. The remainder of the DC power provided by the POE DC to DC converter 44 is provided to the dynamic voltage allocation circuitry 48 over link 67. It is this remaining voltage that is allocated to the various primary, secondary and tertiary etc. components.

The dynamic voltage allocation circuitry 48 is connected to the microcontroller 50 over bidirectional link 68. It is in this way that the microcontroller 50 can indicate to the dynamic voltage allocation circuitry 48, the amount of voltage to provide each primary, secondary, tertiary etc. component. The dynamic voltage allocation circuitry 48 provides power to the secondary, tertiary and other components. Examples of these are illustrated as link 73 to the PTZ mechanism 32, link 74 to the current monitor 46, and links 81 and 82 to the H&B subsystem 36. The H&B subsystem 36 optionally comprises one or more heaters 37, such as for example an electrical resistive heating element, and one or more fans 38 and 39, for circulating an airflow into or though the camera housing 30. The fans 38 and 39 can be configured as inlet, exhaust and/or circulation fans for heating, cooling, dust and debris removal, and/or removal of condensation or fogging from the dome 31 or the lens of camera 33.

Another output of the dynamic voltage allocation circuitry 48 includes a charge line 69A to battery 45. In one embodiment, voltage is applied to charge line 69A whenever there is a surplus of power available for all components. In another embodiment, voltage is applied to charge line 69A whenever the battery 45 reaches a critical level. This critical level is sensed by microcontroller 50 over sensor line 70. Whenever the voltage in the POE splitter 40 is critical, the battery 45 provides additional power, via link 69B, to the POE DC to DC converter 44 to support microcontroller 50, primary, secondary, tertiary and etc. components power needs.

The microcontroller 50 receives the current needs of camera 33 from the current monitor 46 via signal line 75. The current monitor 46 monitors the power requirements of the camera 33 and adjust the on/off times of the heater 37 and other accessories. The microcontroller 50 also receives information regarding the temperature of the POE splitter 40 from the temperature monitor 47 link 76. It is this temperature information that can cause the microcontroller 50 initiate power to heaters 37 via links 68 and 77, when a low temperature threshold is met, and fans 38 and 39 via links 78 and 79, to provide for inlet, exhaust and/or circulation fans for heating, cooling, dust and debris removal, and/or removal of condensation or fogging from the dome 31 or the lens of camera 33.

The microcontroller 50 further receives device status of camera 33 and sends feedback signals on link 72. These device status and feedback signals include, but are not limited to, camera status, lost information packets, alarm and other sensor inputs.

While the invention is described and shown primarily in relation to an example embodiment comprising a surveillance camera 33, the invention may be adapted for use in a variety of applications in POE systems having primary and secondary components, including without limitation telephone systems, electronic display systems, LED lighting systems, automated door sensor systems, alarm systems, wireless computing systems, electronic switching systems, HVAC and utility control systems, and other POE systems now existing or to be developed in the future. Similarly, while primarily described herein in relation to power over Ethernet systems, the invention may be adapted for use in connection with other systems of shared power and data delivery now existing or to be developed in the future.

In an alternative embodiment, where the POE splitter 40 is implemented in hardware, the POE splitter 40 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. Examples of the alternative embodiment, where the POE splitter 40 is implemented in hardware are described in U.S. Provisional Patent Application Ser. No. 61/315,540, filed Mar. 19, 2010, entitled "Power Over Ethernet Prioritization System and Method for Surveillance Cameras", herein incorporated by reference.

Figure 3:
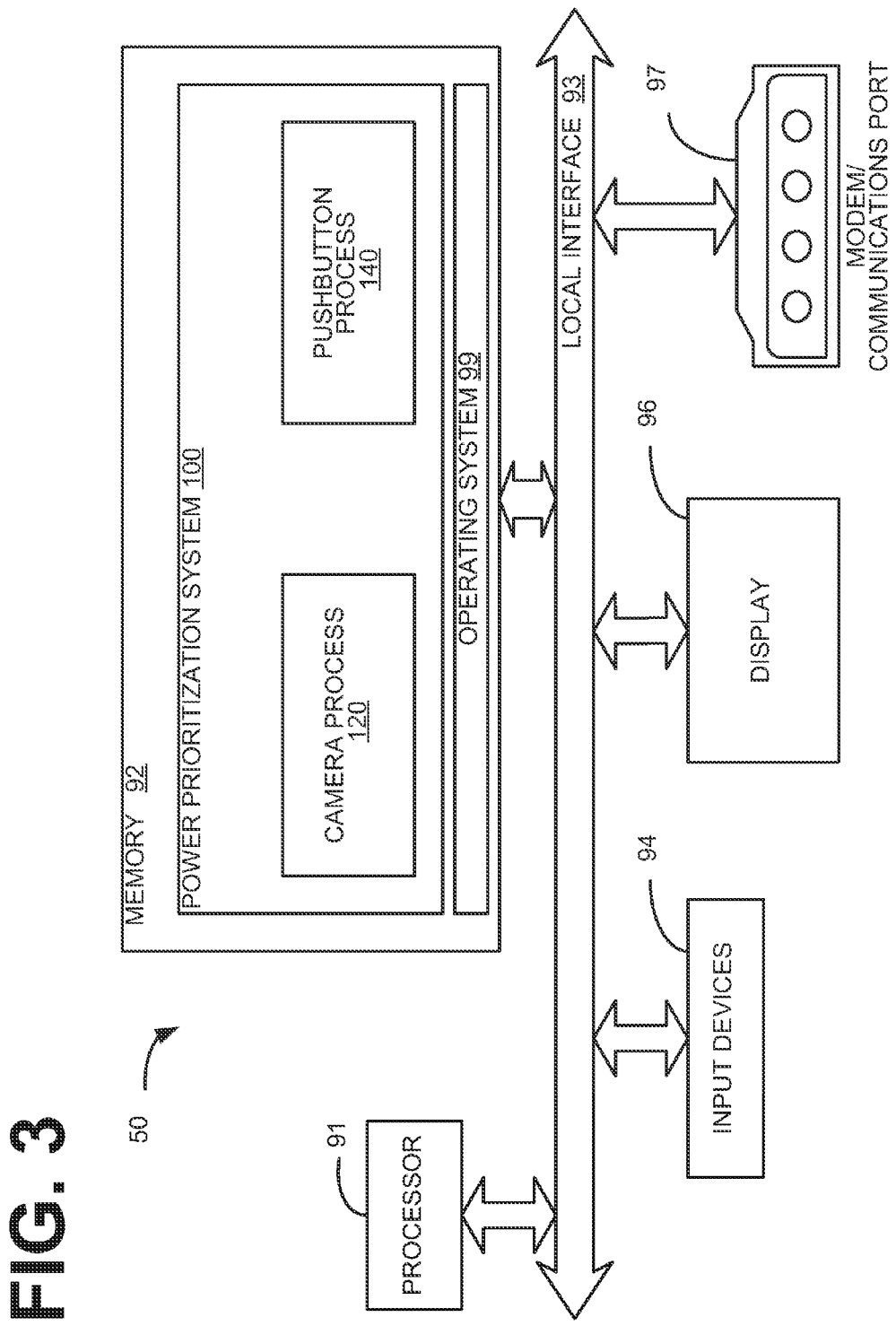
FIG. 3 is a block diagram illustrating an example of a microprocessor utilizing a power prioritization system of the present invention.

FIG. 3 is a block diagram demonstrating an example of microcontroller 50, as shown in FIG. 2, utilizing the power prioritization system 100 of the present invention. The microcontroller 50 receives sensor information and provides control of the power provided to various components.

Generally, in terms of hardware architecture, as shown in FIG. 3, the microcontroller 50 include a processor 91, memory 92, and one or more input and/or output (I/O) devices (or peripherals) that are communicatively coupled via a local interface 93. The local interface 93 can be, for example but not limited to, one or more buses or other wired or wireless connections, as is known in the art. The local interface 93 may have additional elements, which are omitted for simplicity, such as controllers, buffers (caches), drivers, repeaters, and receivers, to enable communications. Further, the local interface 93 may include address, control, and/or data connections to enable appropriate communications among the aforementioned components.

The processor 91 is a hardware device for executing software that can be stored in memory 92. The processor 91 can be virtually any custom made or commercially available processor, a central processing unit (CPU), data signal processor (DSP) or an auxiliary processor among several processors associated with the microcontroller 50, and a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 92 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 92 may incorporate electronic, magnetic, optical, and/or other types of storage media. Note that the memory 92 can have a distributed architecture, where various components are situated remote from one another, but can be accessed by the processor 91.

The software in memory 92 may include one or more separate programs, each of which comprises an ordered listing of executable instructions for implementing logical functions. In the example illustrated in FIG. 2, the software in the memory 92 includes a suitable operating system (O/S) 99 and the power prioritization system 100 of the present invention. As illustrated, the power prioritization system 100 of the present invention comprises numerous functional components including, but not limited to, the camera process 120, and pushbutton process 140.

A non-exhaustive list of examples of suitable commercially available operating systems 99 is as follows (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The operating system 99 essentially controls the execution of other computer programs, such as the power prioritization system 100, and provides scheduling, input-output control, file and data management, memory management, and communication control and related services. However, it is contemplated by the inventors that the power prioritization system 100 of the present invention is applicable on all other commercially available operating systems.

The power prioritization system 100 may be a source program, executable program (object code), script, or any other entity comprising a set of instructions to be performed. When a source program, then the program is usually translated via a compiler, assembler, interpreter, or the like, which may or may not be included within the memory 92, so as to operate properly in connection with the O/S 99. Furthermore, the power prioritization system 100 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices may include input devices, for example but not limited to, a mouse, keyboard, scanner (not shown), microphone (not shown), etc. Furthermore, the I/O devices may also include output devices, for example but not limited to, a printer (not shown), display 96, etc. Finally, the I/O devices may further include devices that communicate both inputs and outputs, for instance but not limited to, a NIC or modulator/demodulator 97 (for accessing remote devices, other files, devices, systems, or a network), a radio frequency (RF) or other transceiver (not shown), a telephonic interface (not shown), a bridge (not shown), a router (not shown), etc.

If the microcontroller 50 is a PC, workstation, intelligent device or the like, the software in the memory 92 may further include a basic input output system (BIOS) (omitted for simplicity). The BIOS is a set of essential software routines that initialize and test hardware at startup, start the O/S 99, and support the transfer of data among the hardware devices. The BIOS is stored in some type of read-only-memory, such as ROM, PROM, EPROM, EEPROM or the like, so that the BIOS can be executed when the microcontroller 50 is activated.

When the microcontroller 50 are in operation, the processor 91 is configured to execute software stored within the memory 92, to communicate data to and from the memory 92, and to generally control operations of the microcontroller 50 are pursuant to the software. The power prioritization system 100 and the O/S 99 are read, in whole or in part, by the processor 91, perhaps buffered within the processor 91, and then executed.

When the power prioritization system 100 is implemented in software, as is shown in FIG. 2, it should be noted that the power prioritization system 100 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method.

The power prioritization system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In an alternative embodiment, where the power prioritization system 100 is implemented in hardware, the power prioritization system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

In the illustrated method of operation, the microcontroller 50 compares the current measured by the current monitor 46 with a predetermined minimum required current stored in memory 92. The predetermined minimum is set at or just above the operational requirement of the camera 33 or other primary component. In the event the monitored current falls below this threshold, the dynamic voltage allocation circuitry 48 will first decrease or shut off the power delivered to the H&B subsystem 36 or other non-essential secondary or tertiary component(s) designated as lowest priority. If the monitored current continues below the threshold, the switching circuit will next decrease or shut off the power delivered to the PTZ mechanism 32 or other secondary or essential secondary components, in order to maintain a required level of operational power to the camera or other primary component. The power device prioritization is generally assigned at the time of programming the microcontroller 50. However, the power device prioritization can be altered at any time during the life of the microcontroller 50 by resetting a device prioritization table (not shown) or hard coding in memory 92. The resetting of the device prioritization table or hard coding is typically accomplished by the microcontroller 50 receiving a signal on cable 22 that resets the device prioritization table or hard coding.

In this manner, constant delivery of sufficient power to operate the camera 33 is provided with highest priority to prevent browning out or resetting of the camera 33. Power delivery to the PTZ mechanism 32 for controlling the field of view of camera 33 is given the next highest priority, and the switching circuit will deliver operational power to the PTZ mechanism 32 so long as doing so does not deprive the camera 33 if adequate power to operate. The H&B subsystem 36 is given the lowest priority, and only receives power that is not needed to operate the camera 33 and the PTZ mechanism 32. Typical power loads range from a low of about 6 W when the camera is idle, to about 16 W when the PTZ mechanism 32 is fully actuated. IEEE 802.3af POE equipment provides up to 15.4 W of power over the Ethernet cable, and IEEE 802.3at (sometimes called POE+) equipment provides up to 25 W of power or more. Because the H&B subsystem 36 is generally designated as having lower priority, it is switched off when the PTZ mechanism 32 requires significant operational power. Thus, the H&B subsystem 36 does not interfere with or interrupt use of the camera 33 or PTZ mechanism 32. Similarly, because the H&B subsystem 36 is only switched on when there is sufficient power available that is not required for camera 33 or PTZ mechanism 32 operation, a larger heater unit 37 and/or higher capacity fans 38 and 39 can be installed without concern that their greater power requirement might interfere with camera 33 or PTZ mechanism 32 operation, thereby enabling faster and more effective heating.

Figure 4:
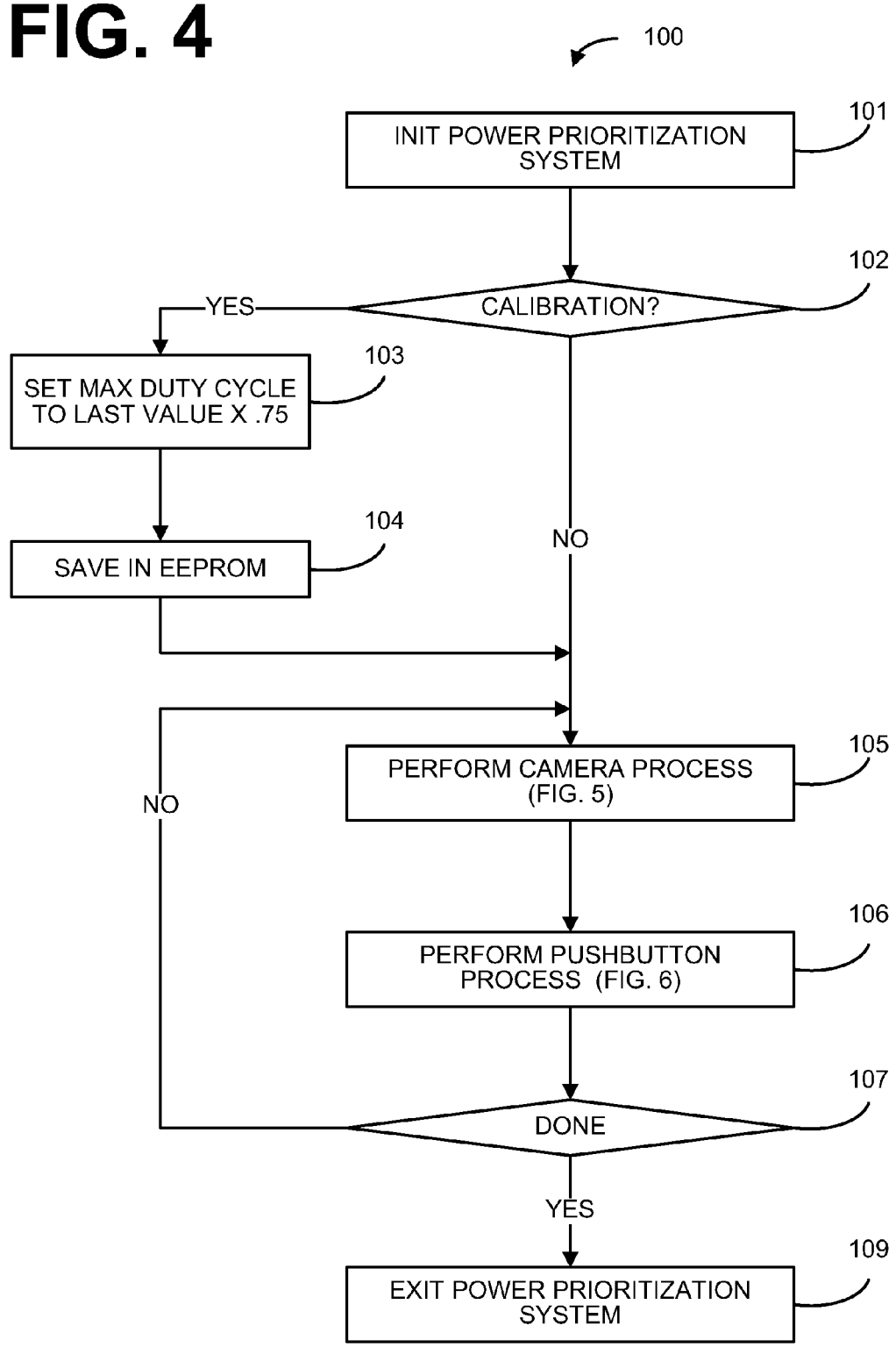
FIG. 4 is a flowchart illustrating an example of the operation of the power prioritization system of the present invention on a microcontroller, as shown in FIGS. 2 and 3.

FIG. 4 is a flowchart illustrating an example of the operation of the power prioritization system 100 of the present invention. In a microcontroller 50, as shown in FIGS. 2 and 3. As the POE powers up, the microcontroller 50 determines if the power up was a normal power up or if the POE was in the middle of a power supply test. If the power up was the result of a test, then the last value written into the EEPROM is taken as the highest allowable duty cycle for the heater 37. A safety margin is applied and the result stored in the EEPROM for future use. After the POE powers up, the microcontroller 50 stores in memory 92 the total system power available (i.e. approximately every millisecond). The microcontroller 50 checks the power requirements of camera 33, and compares to stored value. If power not maximized, microcontroller 50 checks any auxiliary device status. If status for auxiliary device is active, duty cycle is incrementally increased for auxiliary device. The microcontroller 50 continually rechecks camera power requirement and compares to stored value.

First at step 101, the power prioritization system 100 is initialized. This initialization includes a startup routines and processes embedded in the BIOS of the microcontroller 50. The initialization also includes the establishment of data values for particular data structures utilized in the microcontroller 50.

At step 102, the power prioritization system 100 determines if the POE was in the middle of a power supply test (i.e. calibration) if it is determined at step 102 that the POE was not in the middle of a calibration, then the power prioritization system 100 skips the step 105. However, if it is determined at step 102 that the POE was in the middle of a calibration on power up, then the power prioritization system 100 sets the maximum duty cycle to the last value plus a safety margin. In the illustrated example, the safety margin is ¾ the maximum duty cycle of the last value. However, in an alternative embodiment, the safety margin range could be between 50% and 125% of the last duty cycle value. After setting the maximum duty cycle to the last value plus a safety margin, the value is stored in memory at step 104. In the illustrated example, the memory is an EEPROM.

At step 105, the power prioritization system 100 performs the camera process. The camera process is herein defined in further detail with regard to FIG. 5. After performing the camera process, the power prioritization system 100 then performs the pushbutton process at step 106. The pushbutton process is herein defined in further detail with regard to FIG. 6.

At step 107, the power prioritization system 100 determines if the POE splitter 40 is experiencing power down. If it is determined at step 107 that the POE splitter 40 is not experiencing power down, then the power prioritization system 100 returns to repeat steps 105-106. However, if it is determined at step 107 that the POE splitter 40 is experiencing power down, then the power prioritization system 100 exits at step 109.

Figure 5:
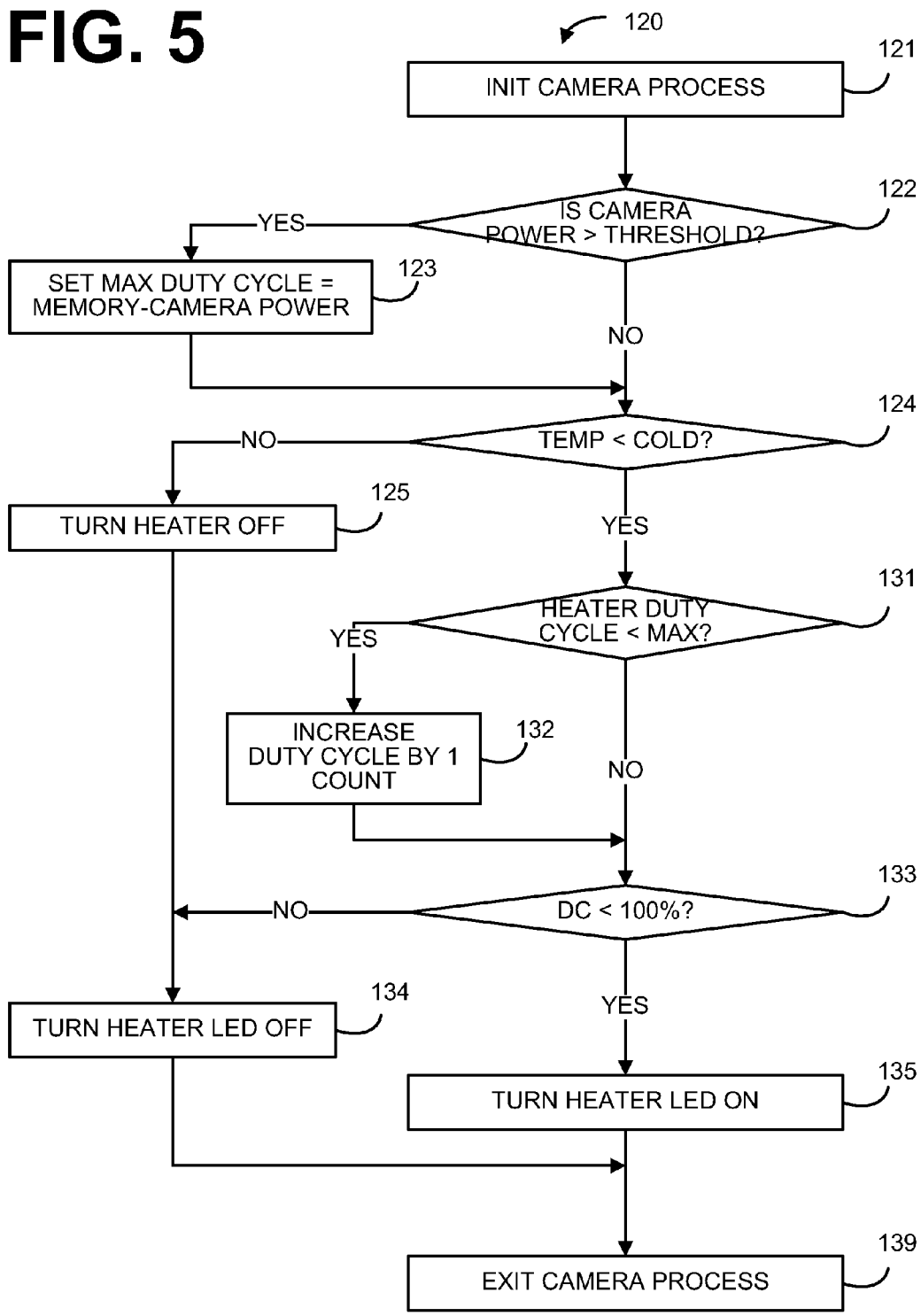
FIG. 5 is a flowchart illustrating an example of the operation of the camera process utilized by the power prioritization system of the present invention as shown in FIGS. 3 and 4.

FIG. 5 is a flowchart illustrating an example of the operation of the camera process 120 utilized by the power prioritization system 100 of the present invention as shown in FIGS. 3 and 4. Approximately every millisecond, the POE splitter 40 checks the current that the camera 33 is drawing. If the current draw is above a maximum allowable threshold, then the maximum allowable threshold becomes the maximum value stored in the memory minus the current of the camera 33. If the temperature is below the cold threshold, then the heater 37 is turned on. The duty cycle is gradually brought up to the allowable maximum allowable duty cycle. If the maximum allowable duty cycle is being reduced by the current of the camera 33, the heater 37 LED is turned on; otherwise the heater 37 LED is off.

First at step 121, the camera process 120 is initialized. This initialization includes a startup routines and processes embedded in the BIOS of the microcontroller 50. The initialization also includes the establishment of data values for particular data structures utilized in the microcontroller 50.

At step 122, the camera process 120 determines if the power used for camera 33 is greater than the predetermined minimum (i.e. threshold). The predetermined minimum is generally assigned at the time of programming the microcontroller 50. However, the predetermined minimum can be altered at any time during the life of the microcontroller 50. If it is determined that the power the camera is currently using is less than the threshold, then the camera process 120 skips to step 124. However, if it is determined at step 122, the camera power is greater than the threshold, then the camera process 120 sets the maximum duty cycle equal to the value in memory 92 minus the camera power at step 123.

At step 124, the camera process 120 determines if the temperature is lower than the predetermined minimum temperature (i.e. cold). The predetermined minimum temperature is generally assigned at the time of programming the microcontroller 50. However, the predetermined minimum temperature can be altered at any time during the life of the microcontroller 50. If it is determined that the current temperature is lower than the predetermined minimum temperature, then the camera process 120 skips to step 131. However, if the current temperature is not lower than the predetermined minimum temperature, then the camera process 120 turns the heater off at step 125, and then skips to step 135.

At step 131, the camera process 120 determines if the heater duty cycle is less than the maximum. If it is determined at step 131 that the heater duty cycle is not less than the maximum, then the camera process 120 skips to step 133. However, if it is determined at step 131 that the heater duty cycle is less than the maximum, then the camera process 120 increases the duty cycle count by one.

At step 133, the camera process 120 determines if the duty cycle is less than 100%. If it is determined at step 133 that the duty cycle is less than 100%, then the camera process 120 turns the heater LED on at step 134 and then exits at step 139.

At step 135, the camera process 120 turns the heater LED off and then exits at step 139.

Figure 6:
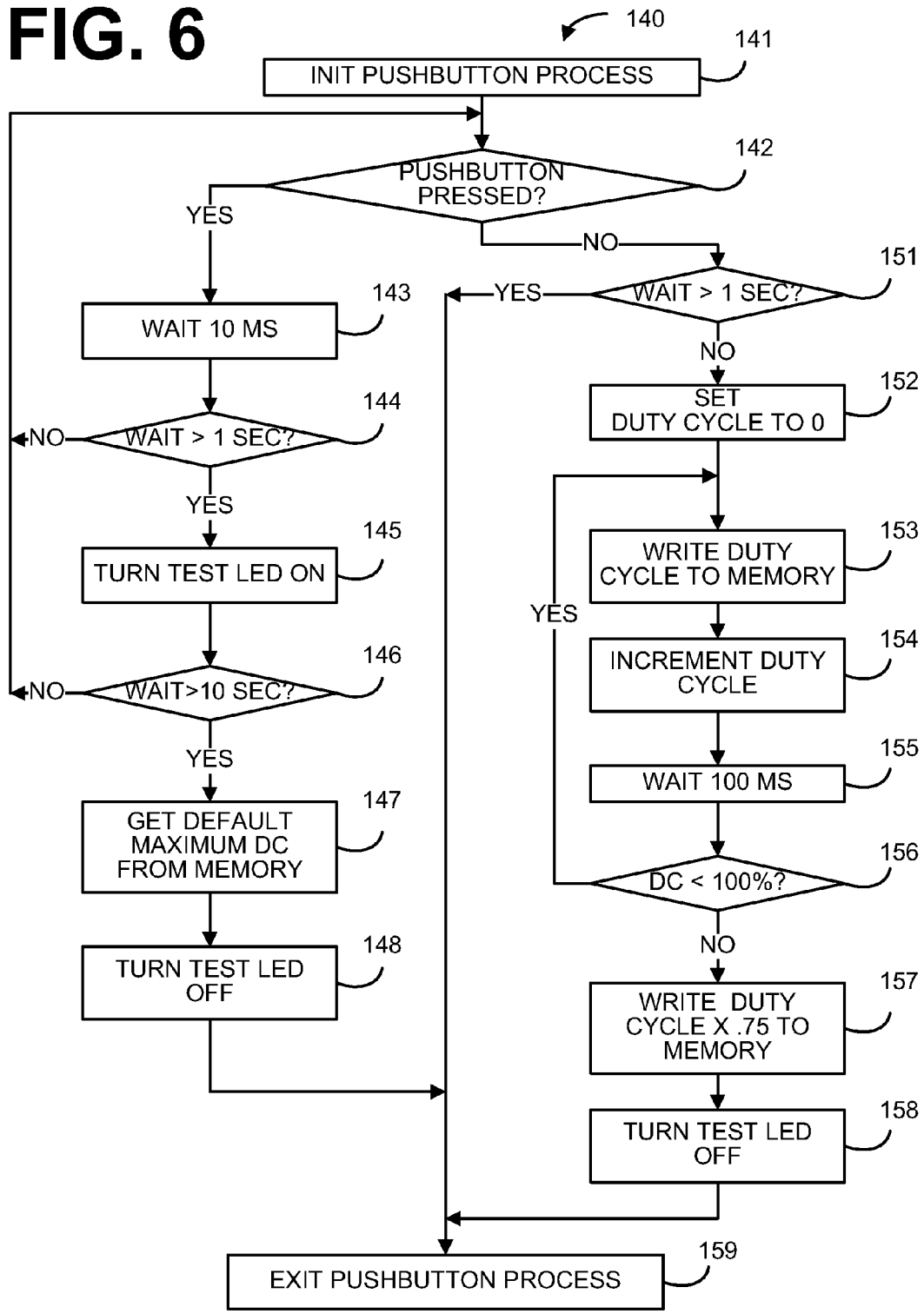
FIG. 6 is a flowchart illustrating an example of the operation of the pushbutton process utilized by the power prioritization system of the present invention as shown in FIGS. 3 and 4.

FIG. 6 is a flowchart illustrating an example of the operation of the pushbutton process 140 utilized by the power prioritization system 100 of the present invention as shown in FIGS. 3 and 4. The pushbutton is always being checked. If the button is pressed for less than a predetermined time period (i.e. approximately 10 ms), then the button press is ignored. If the pushbutton is held for more than the predetermined time period (i.e. approximately 10 ms), but less than the factory reset time period (i.e. approximately 10 seconds), the power supply test process is initiated. If the pushbutton is pressed for over the factory reset time period (i.e. approximately 10 seconds), the factory default value for the maximum heater duty cycle is used for the memory maximum duty cycle. During the power supply test, the duty cycle is incremented and this value is written into the non-volatile memory 92. If, after approximately 100 milliseconds, the power is still good, the duty cycle is incremented and the new value written into the memory 92. If the power supply fails during this test, the microcontroller 50 will reset and wait for the power supply to recover. If 100% duty cycle is reached, the maximum duty cycle is set to 75% and written into memory 92, and then normal operation resumes.

First at step 141, the pushbutton process 140 is initialized. This initialization includes a startup routines and processes embedded in the BIOS of the microcontroller 50. The initialization also includes the establishment of data values for particular data structures utilized in the microcontroller 50.

At step 142, the pushbutton process 140 determines if the pushbutton was pressed. If it is determined that the pushbutton was not pressed, then the pushbutton process 140 skips to step 151. However, if it is determined at step 142, the pushbutton was pressed, then the pushbutton process 140 waits a predetermined time period (i.e., approximately 10 ms) at step 143. At step 144, the pushbutton process 140 determines if the button is pressed for greater than a predetermined time period (i.e. approximately 1 second). If it is determined at step 144 that the button is pressed for less than the predetermined time period (i.e. approximately 1 second), then the pushbutton process 140 returns to step 142 and the button press is ignored. However, if it is determined that the pushbutton is held for more than the predetermined time period (i.e. approximately 1 second), then the pushbutton process 140 turns the test LED on at step 145.

At step 146, the pushbutton process 140 determines if the button is pressed for greater than a predetermined time-period (i.e. approximately 10 seconds). If it is determined at step 146 that the button is pressed for less than the predetermined time-period (i.e. approximately 10 seconds), then the pushbutton process 140 returns to step 142 and the button press is ignored. However, if it is determined that the pushbutton is held for more than the predetermined time-period (i.e. approximately 10 second), then the pushbutton process 140 obtains the default maximum value for the maximum heater duty cycle, at step 147. At step 148, the pushbutton process 140 turns the test LED off and exits at step 159.

At step 151, the pushbutton process determines if the wait was greater than approximately one (1) second. If it is determined that the wait for the pushbutton to be pressed is greater than approximately one (1) second, then the pushbutton process 140 then proceeds to exit at step 159. However, if it is determined at step 151 that the pushbutton process has not waited at least approximately one (1) second, then the pushbutton process than sets the duty cycle equal to zero at step 152. At step 153, the pushbutton process 140 writes the duty cycle into memory 92. At step 154, the duty cycle is incremented and the pushbutton process waits approximately 100 ms at step 155.

At step 156, the pushbutton process 140 determines if the duty cycle is less than 100%. If it is determined at step 156, the duty cycle is less than 100%, then the pushbutton process 140 returns to repeat steps 153-156. However, if it is determined at step 156 that that duty cycle is not less than 100%, then the pushbutton process 140 writes to memory 92 the duty cycle times 0.75 at step 157. At step 158, the pushbutton process then turns the test LED off and then exits at step 159.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations or modifications, additions and deletions may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for prioritized application of operational power receiving over a cable comprising:
    a primary component;
    at least one secondary component;
    a power supply;
    a data transmission cable for delivering the operational power from the power supply to the primary component and the at least one secondary component, and for transmitting data between the primary component and a remote station; and
    a splitter for separating the operational power from the data received over the data transmission cable, and prioritizing delivery of the operational power to the primary component and the at least one secondary component, wherein power to the primary component is monitored and a predetermined minimum threshold is set at approximately the operational requirement of the primary component and if the monitored power falls below the predetermined minimum threshold, the splitter will decrease the power delivered to the at least one secondary component to an operational power to operate the at least one secondary component.

2. The system of claim 1, wherein the data transmission cable comprises a plurality of channels, at least one of said plurality of channels carrying the data, and another at least one of said plurality of channels carrying the operational power.

3. The system of claim 1, wherein the data transmission cable is an Ethernet cable.

4. The system of claim 1, wherein the primary component comprises a surveillance camera.

5. The system of claim 4, wherein the surveillance camera comprises a pan-tilt-zoom mechanism.

6. The system of claim 4, wherein the at least one secondary component comprises a heater/blower for the surveillance camera.

7. The system of claim 4, wherein the at least one secondary component comprises a pan-tilt-zoom mechanism for the surveillance camera.

8. The system of claim 1, wherein the splitter comprises a current sensor for sensing delivery of the operational power to the primary component, and a microprocessor for comparing delivery of the operational power to the primary component relative to the threshold level of power.

9. The system of claim 1, wherein the operational power to the at least one secondary component is shut off if the operational power delivered to the at least one secondary component falls below a second predetermined minimum threshold for the at least one secondary component.

10. The system of claim 1, further comprising:
    a battery that provides additional power when the operational power falls to a critical level and the battery is charged when there is a surplus of operational power available.

11. The system of claim 1, further comprising:
    at least one tertiary component that is switched on when there is sufficient operational power available that is not required for the primary component and the at least one secondary component operations.

12. A method of prioritizing delivery of operational power to a primary component and a secondary component, comprising:
    transmitting the operational power and data over a data transmission cable;
    transmitting the operational power from the data transmission cable to the primary component;
    comparing monitoring and the operational power delivered to the primary component relative to a threshold power level; and
    transmitting the threshold power level to the primary component and if the monitored operational power falls below the threshold power level, splitter will decrease the power delivered to the at least one secondary component.

13. The method of claim 12, wherein the primary component is a video surveillance camera.

14. The method of claim 13, wherein the video surveillance camera further comprises a pan-tilt-zoom mechanism.

15. The method of claim 13, wherein the secondary component is a heater/blower for the video surveillance camera.

16. The method of claim 13, wherein the secondary component is a pan-tilt-zoom mechanism for the video surveillance camera.

17. A power over Ethernet splitter for delivery of operational power to a primary component and a secondary component, comprising:
   means for sensing a state of power transmission to the primary component;
   means for comparing the state of power transmission to the primary component relative to a threshold power level; and
   means for transmission of the threshold power level to the primary component and if the sensed operational power falls below the threshold power level, the transmission means will decrease the power delivered to the at least one secondary component.

18. A method of prioritizing delivery of operational power to a primary component and a secondary component embodied in a computer program product for execution on an instruction processing system, comprising a tangible storage medium readable by the instruction processing system and storing instructions for execution by the instruction processing system for performing the method comprising:
   measuring the operational power being transmitted to the primary component;
   comparing the operational power being transmitted to the primary component relative to a threshold power level; and
   transmitting the threshold power level to the primary component and if the measured operational power falls below the threshold power level, the power delivered to the at least one secondary component is decreased.

19. The method of claim 18, wherein the secondary component is a heating element, further comprising:
   determining a temperature of the primary component;
   setting the heating element to off if the temperature of the primary component is above a predetermined bottom threshold.

20. The method of claim 18, wherein the secondary component is a heating element, further comprising:
   determining a temperature of the primary component;
   turning the heating element on if the temperature of the primary component is below a predetermined bottom threshold.

21. The method of claim 18, wherein the secondary component is a heating element, further comprising:
   determining if a power supply test is to be performed;
   incrementing a duty cycle value for the heating element if the power supply test is to be performed;
   waiting a predetermined time to validate that the available power to the heating element has not failed during the power supply test; and
   writing the duty cycle value to memory.

22. The method of claim 21, further comprising:
   determining if 100% of the duty cycle value is reached during the power supply test;
   setting a maximum duty cycle to 75% of the duty cycle value; and
   writing the maximum duty cycle to memory.

* * * * *